United States Patent
Wei et al.

(10) Patent No.: US 8,454,347 B2
(45) Date of Patent: Jun. 4, 2013

(54) SPRUE DEVICE FOR USE IN AN INJECTION MOLD

(75) Inventors: Dian-Hong Wei, Shenzhen (CN); Du-Xi Gao, Shenzhen (CN); Zhong-Hai Xiao, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 40 days.

(21) Appl. No.: 13/327,489

(22) Filed: Dec. 15, 2011

(65) Prior Publication Data

US 2013/0004614 A1 Jan. 3, 2013

(30) Foreign Application Priority Data

Jun. 29, 2011 (CN) .......................... 2011 1 0179307

(51) Int. Cl.
*B29C 45/72* (2006.01)

(52) U.S. Cl.
USPC ............................ 425/547; 425/549; 425/552

(58) Field of Classification Search
USPC .................................. 425/547, 548, 549, 552
See application file for complete search history.

(56) References Cited

U.S. PATENT DOCUMENTS

| | | | | |
|---|---|---|---|---|
| 2,911,680 A * | 11/1959 | Kelly | ............................. | 425/170 |
| 3,530,539 A * | 9/1970 | Gellert | ............................ | 425/547 |
| 4,622,001 A * | 11/1986 | Bright et al. | .................. | 425/549 |
| 5,055,025 A * | 10/1991 | Muller | ........................... | 425/144 |
| 6,936,199 B2 * | 8/2005 | Olaru | ........................... | 264/40.6 |
| 7,798,806 B2 * | 9/2010 | Neter et al. | ..................... | 425/533 |

* cited by examiner

*Primary Examiner* — Tim Heitbrink
(74) *Attorney, Agent, or Firm* — Altis Law Group, Inc.

(57) ABSTRACT

A sprue device for an injection mold includes a first part and a second part. The sprue device is sealed and water-cooled so as to reduce overall molding time. The connecting section defines spiral grooves. The second part includes a chassis and an extension from the chassis. The chassis is defined with a through hole, and two gates communicated with the through hole respectively. The spiral grooves mate with the wall of the mounting hole to form a spiral runner. The gates, the through hole, and the spiral runner communicate with each other. An injection mold using the sprue device is also described.

20 Claims, 6 Drawing Sheets

SPRUE DEVICE FOR USE IN AN INJECTION MOLD

BACKGROUND

1. Technical Field

The present disclosure relates to an injection molding.

2. Description of Related Art

Many injection molds include an upper mold and a lower mold. The upper mold defines a sprue and a runner. Molten plastic is injected through the sprue and the runner and run into the cavity of the injection mold to mold a product. After cooling, the product may be unloaded. However, the molten plastic usually takes time to cool, prolonging the overall molding process.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
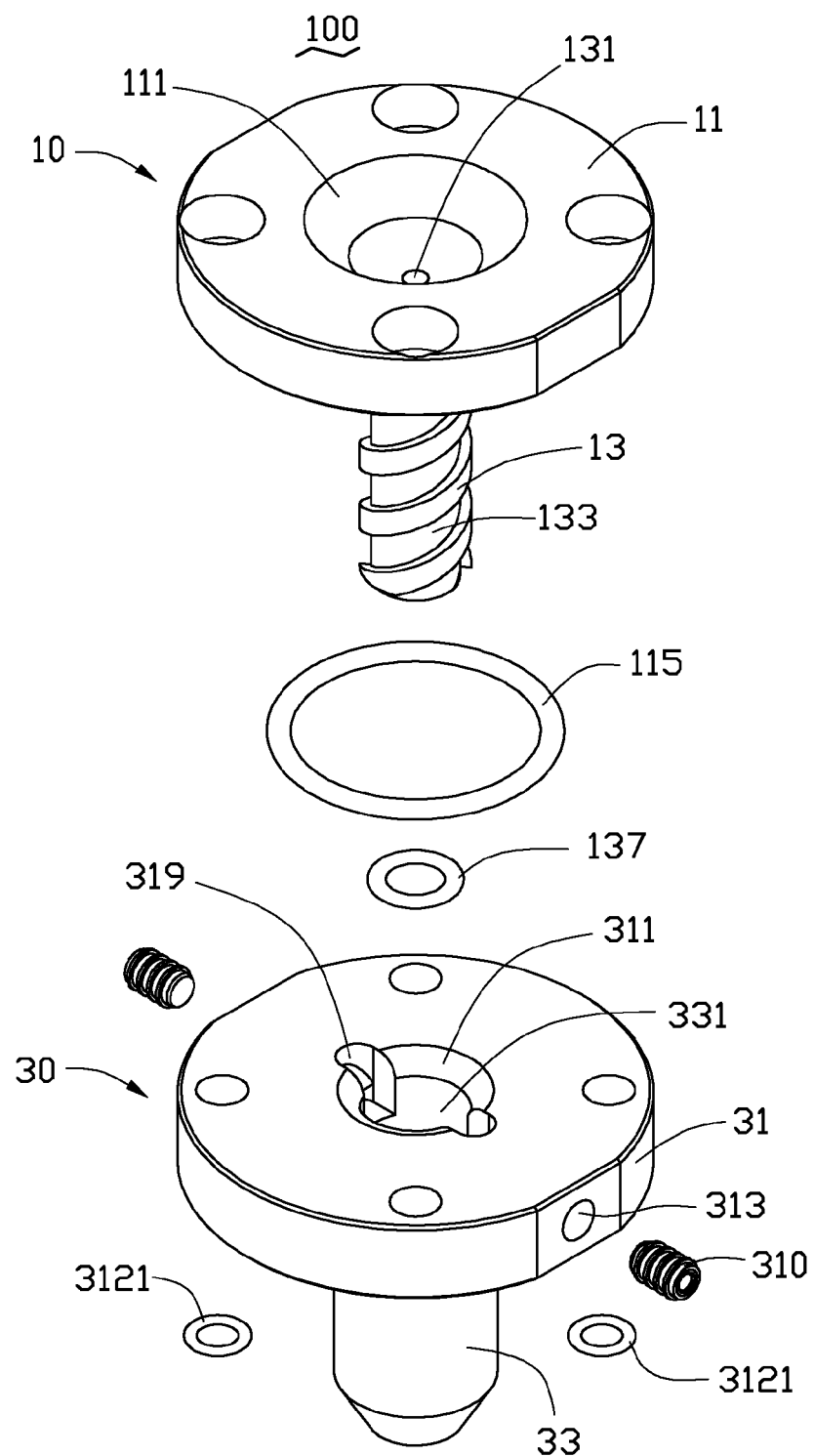
FIG. 1 is an exploded view of an exemplary embodiment of a sprue device.
Figure 2:
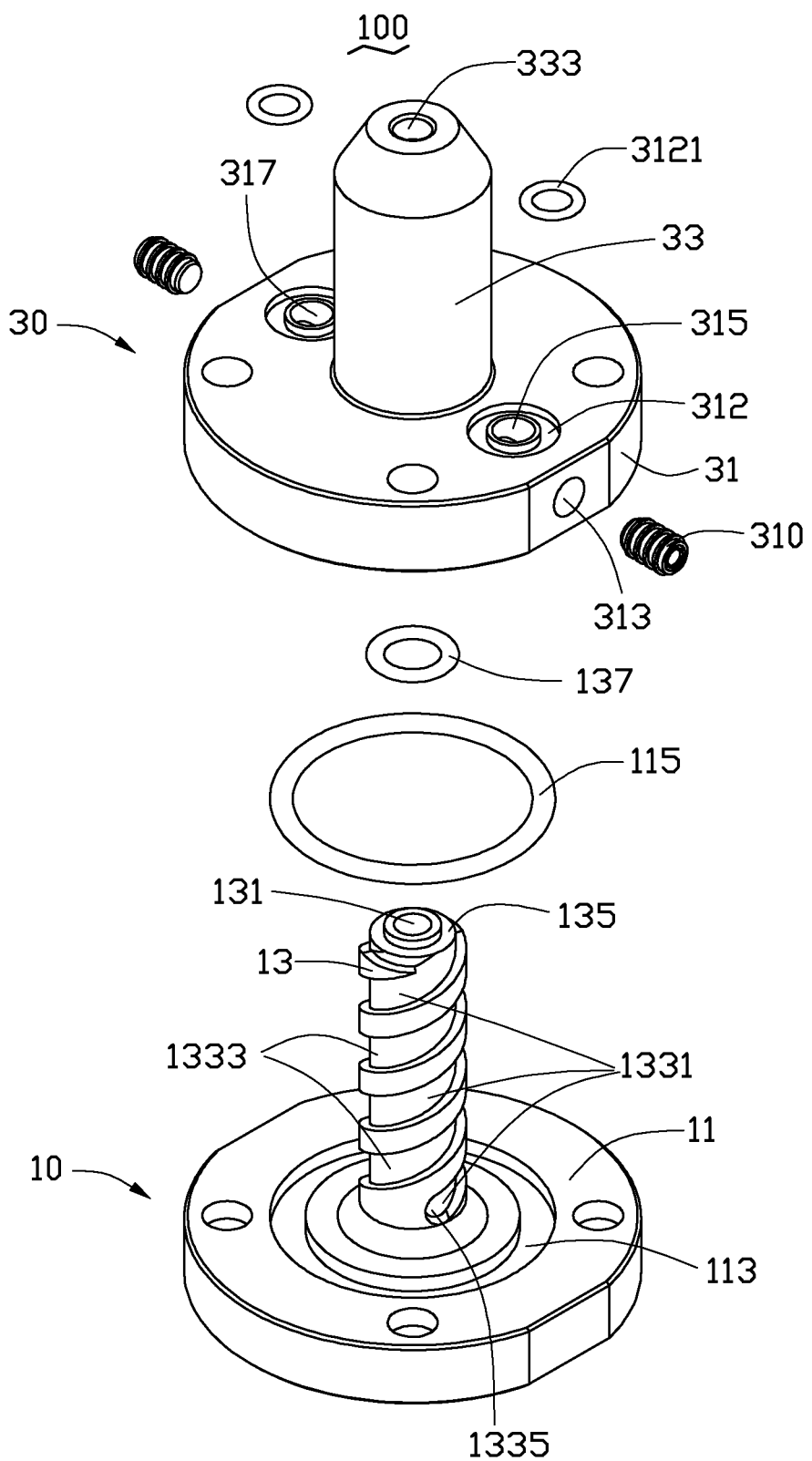
FIG. 2 is another exploded view of the sprue device shown in FIG. 1.
Figure 3:
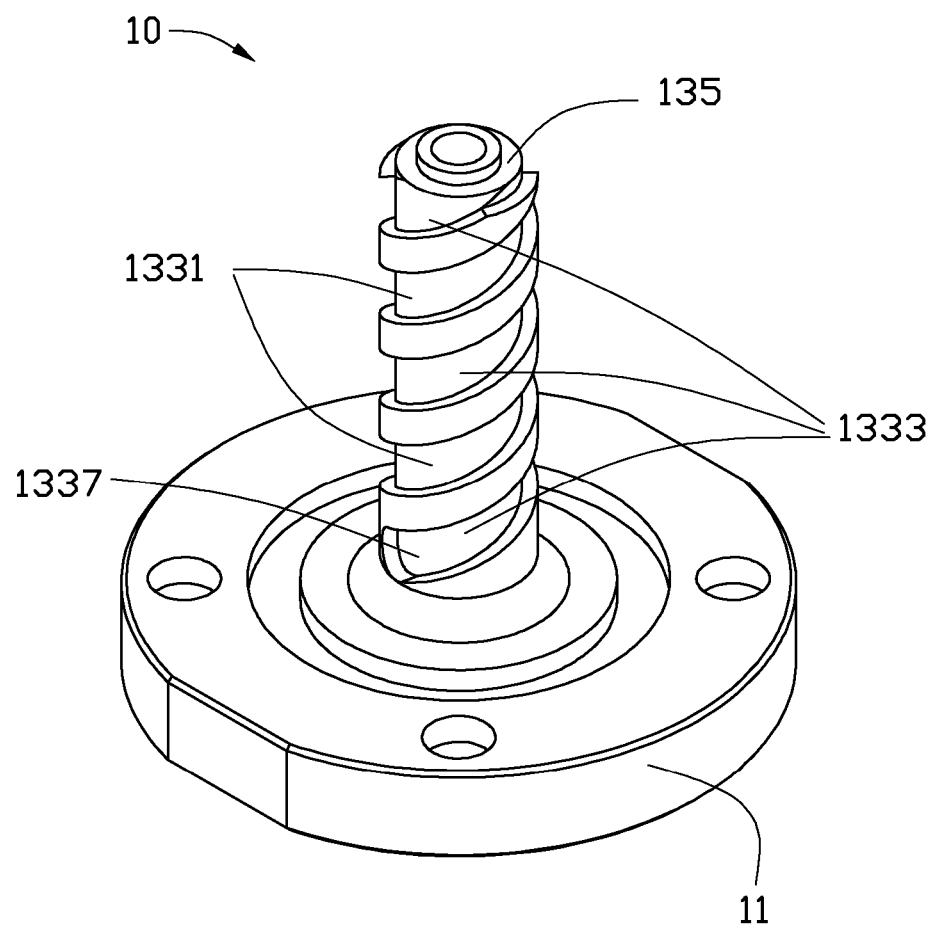
FIG. 3 is an isometric view of a first part of the sprue device of FIG. 1.

FIGS. 1-3 show a sprue device 100 according to an exemplary embodiment. The sprue device 100 is made of alloy steel or other shapeable but long-lasting material.

The sprue device 100 includes a first part 10, and a second part 30 connected to the first part 10 but removable from it. The second part 30 may be connected to the first part 10 by screws, for example.

The first part 10 includes a supply section 11 and a connecting section 13 extending from the supply section 11. The supply section 11 has a supply gate 111 formed in the center of the top surface thereof. The connecting section 13 defines a first runner 131 through the connecting section 13, extending along the supply gate 111. The diameter of the first runner 131 gradually increases from the point nearest the supply gate 111 to the end of the first runner 131. A first annular groove 113 is defined in the bottom surface of the supply section 11 and around the connecting section 13. A first sealing ring 115 is received in the first annular groove 113. The first sealing ring 115 is made of rubber capable of withstanding high temperatures.

Referring to FIGS. 2 and 3, the connecting section 13 defines a pair of spiral grooves 133. The spiral grooves 133 include a first spiral groove 1331 and a second spiral groove 1333 out of phase with each other. The first spiral groove 1331 and the second spiral groove 1333 converge near the bottom surface of the connecting section 13. The first spiral groove 1331 and the second spiral groove 1333 respectively define inlet 1335 and outlet 1337. The inlet 1335 and the outlet 1337 are arranged in a bilateral symmetry around the first runner 131. A notch 135 is formed partly in the connecting section 13 and partly on the bottom end of the spiral grooves 133. A second sealing ring 137 is received in the notch 135. The second sealing ring 137 is made of rubber capable of withstanding high temperatures.

The second part 30 includes a chassis 31 having a circular shape and an extending section 33 extending from the chassis 31. The chassis 31 defines an entrance 311 in the center of its top surface. The entrance 311 defines a concave arcuate sidewall. The chassis 31 defines a through hole 313 through the peripheral wall of the chassis 31, vertically communicating with the entrance 311. Gates 315 and 317 are defined in the bottom surface of the chassis 31. The gate 315 and the gate 317 are arranged in bilateral symmetry around the extending section 33. The gates 315 and 317 vertically communicate with the through hole 313. Two screws 310 are mounted in the ends of the through hole 313 to seal the through hole 313.

Two second annular grooves 312 are formed in the bottom surface of the chassis 31 and around the gates 315 and 317. Two third sealing rings 3121 are received in the two second annular grooves 312. The third sealing ring 3121 is also made of rubber capable of withstanding high temperatures.

A mounting hole 331 is formed in the chassis 31 and the extending section 33 extending from the entrance 311. The mounting hole 331 mates with the connecting section 13 of the first part 10. By extending along the mounting hole 331, a second runner 333 is formed through the end of the extending section 33. The mounting hole 331 has a diameter proportionate to the external diameter of the connecting section 13. The connecting section 13 is tightly mounted in the mounting hole 331 and the spiral grooves 133 mate with the walls of the mounting hole 331 to form a spiral runner 20. The diameter of the mounting hole 331 is larger than that of the second runner 333. The diameter of the second runner 333 gradually becomes larger from the point nearest the mounting hole 331 to the end of the second runner 333.

The chassis 31 defines two symmetrical leading holes 319. The leading holes 319 communicate with the entrance 311 and vertically communicate with the through hole 313.

Figure 4:
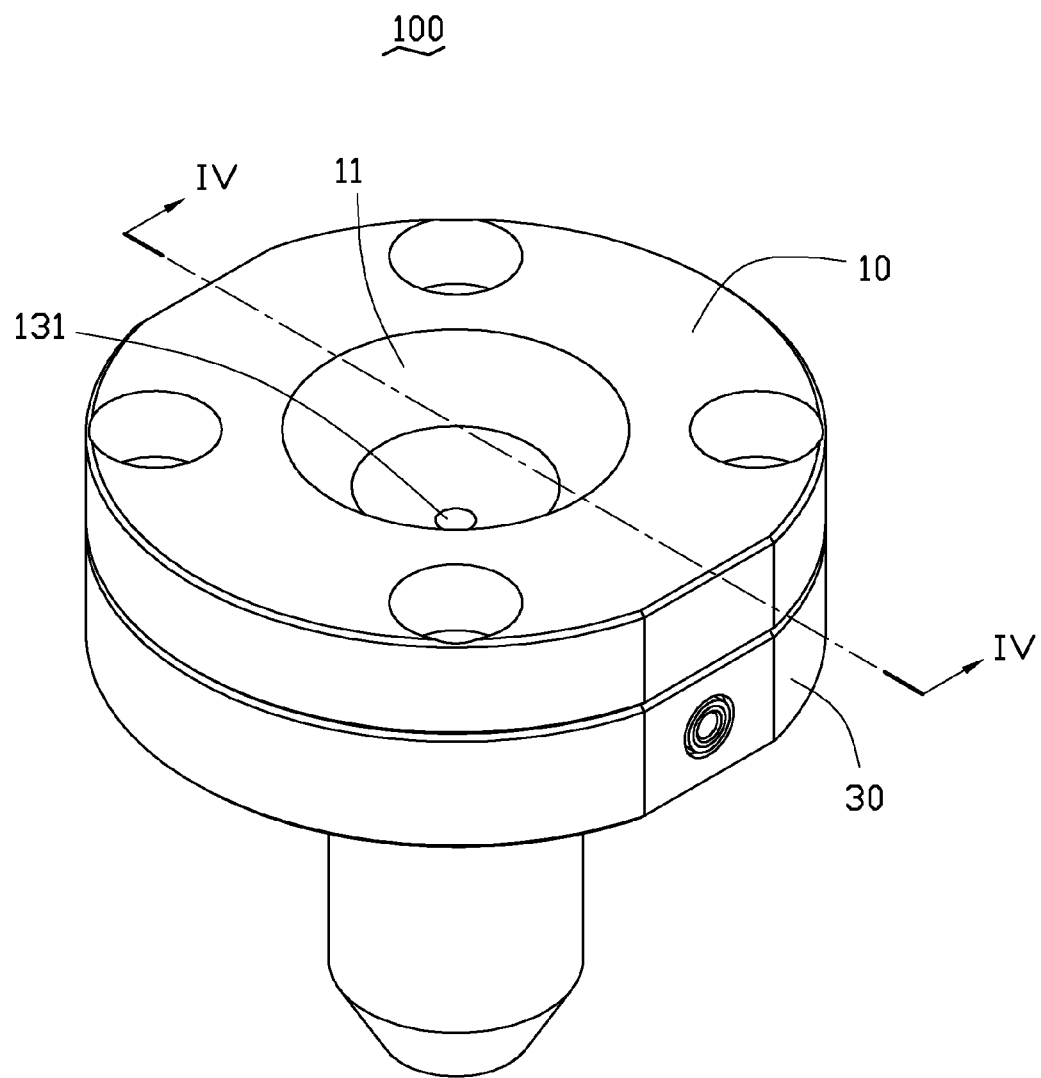
FIG. 4 is an assembled view of an exemplary embodiment of the sprue device shown in FIGS. 1 and 2.
Figure 5:
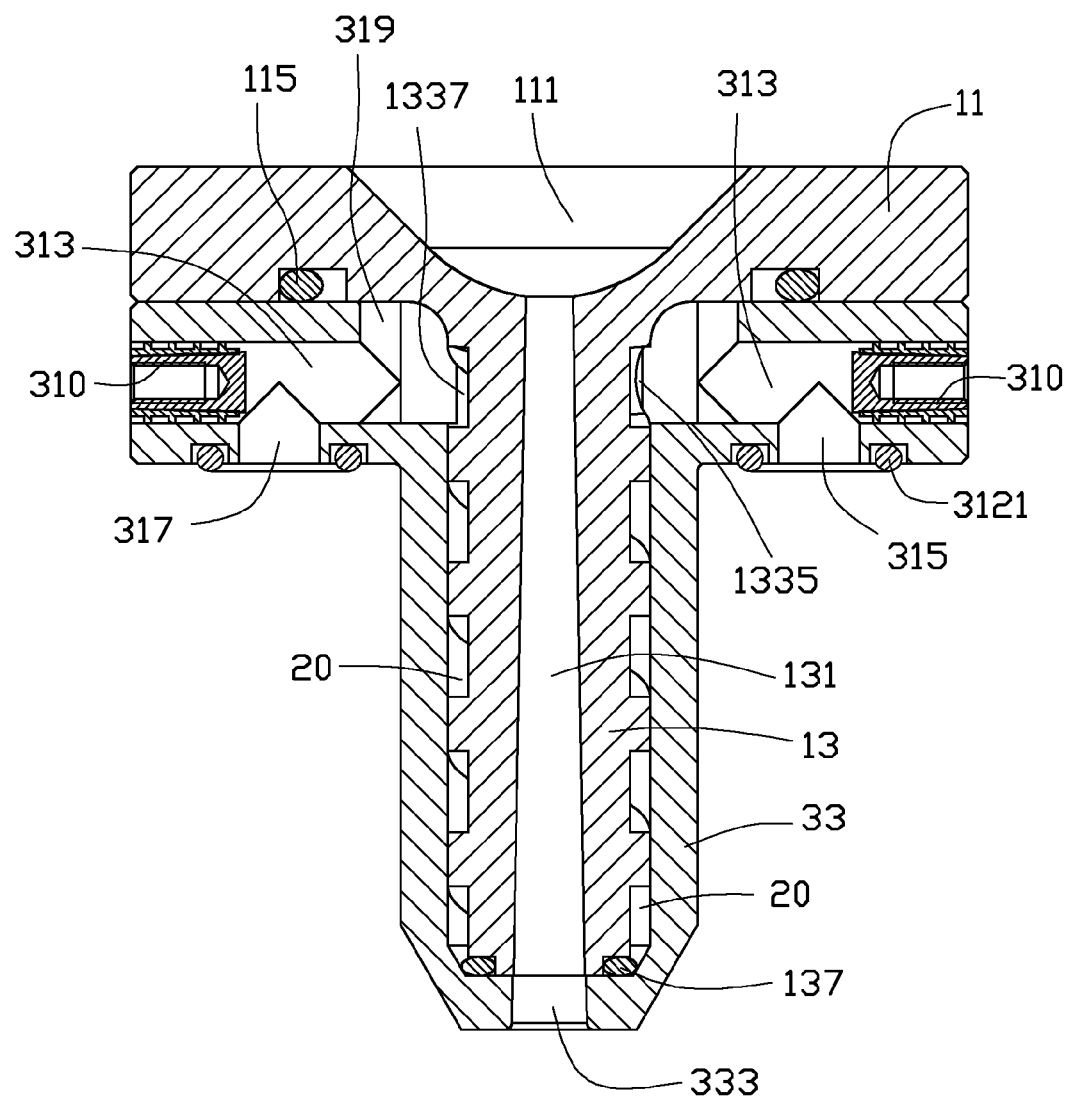
FIG. 5 is a sectional view of the sprue device of FIG. 1 (taken along line IV-IV).

Referring to FIGS. 4 and 5, during the coupling of the first part 10 and the second part 30, the connecting section 13 of the first part 10 is mounted to the extending section 33 of the second part 30, and the supply section 11 is fixed with the chassis 31 by screws. As such, the spiral grooves 133 mate with the wall of the mounting hole 331 and form the spiral runner 20. The inlet 1335 and the outlet 1337 of the spiral grooves 133 communicate with the through hole 313, making the gate 315, the through hole 313, the spiral runner 20, and the gate 317 all communicate with each other and form a passage or runner enabling the sprue device 100 to be water-cooled. The cross-sectional area of the spiral runner 20 is proportionate to the cross-sectional area of each of the gates 315 and 317, allowing the cooling water to flow freely in the spiral runner 20.

The leading holes 319 increase the communication area of the through hole 313 and the inlet 1335 and the communication area of the through hole 313 and the outlet 1337, enhancing the un-turbulent (or coherent) flow of cooling water in the through hole 313 and the spiral runner 20.

The first sealing ring 115 is compressed between the first annular groove 113 and the chassis 31 to prevent water leaking. The second sealing ring 137 is compressed between the notch 135 and the extending section 33 and also prevents leaking. The first runner 131 and the second runner 333 communicate with each other and form a sprue of the sprue device 100.

Figure 6:
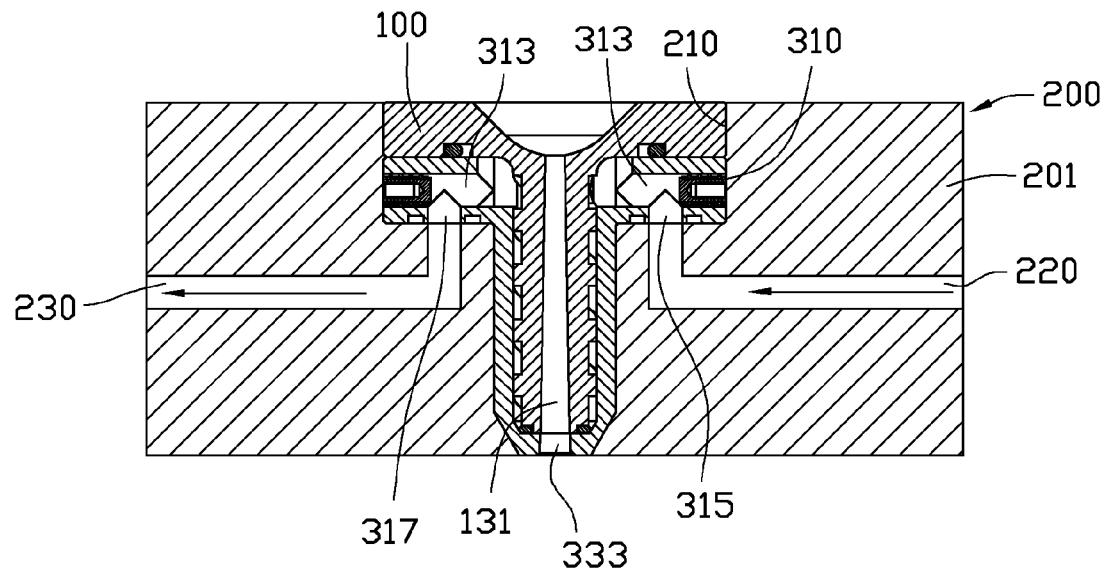
FIG. 6 is a sectional view of an exemplary embodiment of an injection mold using the sprue device.

Referring to FIG. 6, this shows the sprue device 100 being used in an injection mold 200. The injection mold 200 includes an upper mold 201. The upper mold 201 defines a mounting groove 210 for receiving the sprue device 100. The sprue device 100 is secured to the mounting groove 210 by screws. An inlet waterway 220 and an outlet waterway 230 are formed in the upper mold 201. The inlet waterway 220 communicates with the gate 315, and the outlet waterway 230 communicates with the gate 317. The third sealing rings 3121 prevent the cooling water leaking from the gates 315 and 317.

During molding, the cooling water first flows into the gate 315 from the inlet waterway 220 and into the through hole 313, the spiral runner 20, the through hole 313, and the gate 317, and finally flows out from the outlet waterway 230. The cooling water takes heat from the plastic injected into the first runner 131 and the second runner 333 and saves overall molding time.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A sprue device for an injection mold, comprising:
a first part comprising a connecting section, the connecting section defining a pair of spiral grooves; and
a second part comprising a chassis and an extending section extending from the chassis, the chassis defining a through hole, and two gates communicating with the through hole, the chassis and the extending section defining a mounting hole communicating with the through hole;
the mounting hole having a diameter proportional to the external diameter of the connecting section, the connecting section assembling in the mounting hole and the spiral grooves mating with the wall of the mounting hole to form a spiral runner, the gates, the through hole, and the spiral runner communicating with each other.

2. The sprue device as claimed in claim 1, wherein the spiral grooves comprise a first spiral groove and a second spiral groove out of phase with each other, the first spiral groove and the second spiral groove converge near the bottom surface of the connecting section, the first spiral groove and the second spiral groove respectively form an inlet and an outlet of the spiral grooves, the inlet and the outlet all communicate with the through hole.

3. The sprue device as claimed in claim 1, wherein the first part further comprises a supply section extending from the connecting section, the supply section has a supply gate formed in the center of the top surface, extending along the supply gate a first runner is formed in the connecting section and through the connecting section, the diameter of the first runner gradually becomes larger from the point nearest the supply gate to the end of the first runner.

4. The sprue device as claimed in claim 3, wherein a first annular groove is defined in the bottom surface of the supply section and around the connecting section, the first annular groove mates with a first sealing ring, the first sealing ring is made of rubber capable of withstanding high temperatures.

5. The sprue device as claimed in claim 1, wherein a notch is formed in the connecting section and on the bottom end of the spiral grooves, the notch mates with a second sealing ring, the second sealing ring is made of rubber capable of withstanding high temperatures.

6. The sprue device as claimed in claim 1, wherein the through hole is defined in the peripheral wall of the chassis and through the peripheral wall, the through hole vertically communicates with the two gates, the ends of the through hole are mounted with screws.

7. The sprue device as claimed in claim 1, wherein two second annular grooves are formed in the bottom surface of the chassis and around the two gates, the two second annular grooves respectively mate with a third sealing ring, the third sealing ring is made of rubber capable of withstanding high temperatures.

8. The sprue device as claimed in claim 1, wherein the chassis defines with an entrance in the center of the top surface, the entrance vertically communicates with the through hole, the mounting hole is formed in the chassis and the extending section extending along the entrance, a second runner is formed through the end of the extending section extending along the mounting hole, the diameter of the second runner gradually becomes larger from the point nearest the mounting hole to the end of the second runner.

9. The sprue device as claimed in claim 8, wherein diameter of the mounting hole is larger than the diameter of the second runner.

10. The sprue device as claimed in claim 8, wherein the chassis is further defined with two symmetrical leading holes communicated with the entrance and vertically communicated with the through hole.

11. The sprue device as claimed in claim 1, wherein cross-sectional area of the spiral runner is proportionate to the cross-sectional area of each of the gate.

12. The sprue device as claimed in claim 8, wherein the first runner and the second runner communicate with each other.

13. An injection mold, comprising:
an upper mold, and
a sprue device secured in the upper mold, the sprue device comprising:
a first part comprising a connecting section, the connecting section defining a pair of spiral grooves; and
a second part comprising a chassis and an extending section extending from the chassis, the chassis defining a through hole, and two gates communicating with the through hole, the chassis and the extending section defining a mounting hole communicating with the through hole;
the mounting hole having a diameter proportional to the external diameter of the connecting section, the connecting section assembling in the mounting hole and the spiral grooves mating with the wall of the mounting hole to form a spiral runner, the gates, the through hole, and the spiral runner communicating with each other.

14. The injection mold as claimed in claim 13, wherein an inlet waterway and an outlet waterway are formed in the upper mold, the inlet waterway and the outlet waterway communicate with the two gates.

15. The injection mold as claimed in claim 13, wherein the upper mold defines with a mounting groove, the sprue device is secured to the mounting groove by screws.

16. The injection mold as claimed in claim 13, wherein the spiral grooves comprise a first spiral groove and a second spiral groove out of phase with each other, the first spiral groove and the second spiral groove converge near the bottom surface of the connecting section, the first spiral groove and the second spiral groove respectively form an inlet and an outlet of the spiral grooves, the inlet and the outlet all communicate with the through hole.

17. The injection mold as claimed in claim 13, wherein the first part further comprises a supply section extending from the connecting section, the supply section has a supply gate formed in the center of the top surface, extending along the supply gate a first runner is formed in the connecting section and through the connecting section, the diameter of the first runner gradually becomes larger from the point nearest the supply gate to the end of the first runner.

18. The injection mold as claimed in claim 13, wherein a notch is formed in the connecting section and on the bottom end of the spiral grooves, the notch mates with a second sealing ring, the second sealing ring is made of rubber capable of withstanding high temperatures.

19. The injection mold as claimed in claim 13, wherein the through hole is defined in the peripheral wall of the chassis and through the peripheral wall, the through hole vertically communicates with the two gates, the ends of the through hole are mounted with screws.

20. The injection mold as claimed in claim 13, wherein the chassis defines with an entrance in the center of the top surface, the entrance vertically communicates with the through hole, the mounting hole is formed in the chassis and the extending section extending along the entrance, a second runner is formed through the end of the extending section extending along the mounting hole, the diameter of the second runner gradually becomes larger from the point nearest the mounting hole to the end of the second runner.

* * * * *